United States Patent
Zhu et al.

(10) Patent No.: US 12,210,243 B2
(45) Date of Patent: Jan. 28, 2025

(54) QUANTUM DOT INTEGRATED BOARD, METHOD FOR PREPARING QUANTUM DOT INTEGRATED BOARD, AND DISPLAY APPARATUS INCLUDING QUANTUM DOT INTEGRATED BOARD

(71) Applicants: Xiaobo Zhu, Guangdong (CN); CANNANO JIAYUAN (GUANGZHOU) SCIENCE & TECHNOLOGY CO., LTD., Guangdong (CN)

(72) Inventors: Xiaobo Zhu, Guangdong (CN); Yue Xu, Guangdong (CN); Dongliang Zhu, Guangdong (CN); Boran Dong, Guangdong (CN); Sanwei Guo, Guangdong (CN)

(73) Assignees: Xiaobo Zhu, Guangdong (CN); CANNANO JIAYUAN (GUANGZHOU) SCIENCE & TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 18/691,317

(22) PCT Filed: Nov. 7, 2022

(86) PCT No.: PCT/CN2022/130404
§ 371 (c)(1),
(2) Date: Mar. 12, 2024

(87) PCT Pub. No.: WO2023/083146
PCT Pub. Date: May 19, 2023

(65) Prior Publication Data
US 2024/0427194 A1 Dec. 26, 2024

(30) Foreign Application Priority Data

Nov. 9, 2021 (CN) .......................... 202111316972.8

(51) Int. Cl.
*G02F 1/1335* (2006.01)
*G02F 1/13357* (2006.01)

(52) U.S. Cl.
CPC .. *G02F 1/133607* (2021.01); *G02F 1/133615* (2013.01); *G02F 1/133621* (2013.01)

(58) Field of Classification Search
CPC ...................... G02F 1/133507; G02F 1/01791
See application file for complete search history.

(56) References Cited

U.S. PATENT DOCUMENTS

2020/0073039 A1\* 3/2020 Kim ..................... G02B 6/005
2020/0117030 A1\* 4/2020 Lee ....................... G02B 6/005
(Continued)

FOREIGN PATENT DOCUMENTS

CN 105856763 A 8/2016
CN 106501995 A 3/2017
(Continued)

*Primary Examiner* — Paul C Lee
(74) *Attorney, Agent, or Firm* — The Sun IP Law

(57) ABSTRACT

A quantum dot integrated board, a method for preparing a quantum dot integrated board, and a display apparatus including a quantum dot integrated board. The quantum dot integrated board includes a first optical transition layer, a first quantum dot layer, a second optical transition layer, and a second quantum dot layer, which are sequentially arranged. The refractive indexes of the layers meet: $t_{first\ optical\ transition\ layer} < t_{first\ quantum\ dot\ layer}$, $t_{second\ optical\ transition\ layer} < t_{first\ quantum\ dot\ layer}$, $t_{second\ optical\ transition\ layer} < t_{second\ quantum\ dot\ layer}$; and the first quantum dot layer includes a red quantum dot material, and the second quantum dot layer includes a green quantum dot material. Therefore, a brightness enhancement structure is better used, the utilization rate of light is increased, and the output of blue light is reduced while the brightness value of a quantum dot board material is increased.

20 Claims, 2 Drawing Sheets

(56) References Cited

U.S. PATENT DOCUMENTS

2020/0251529 A1* 8/2020 Chu .................... G02B 6/0051
2021/0159436 A1   5/2021 Zhuang

FOREIGN PATENT DOCUMENTS

| CN | 106903945 A |   | 6/2017  |              |
|----|-------------|---|---------|--------------|
| CN | 107656330 A | * | 2/2018  | ....... G02F 1/133606 |
| CN | 108303819 A |   | 7/2018  |              |
| CN | 108303823 A |   | 7/2018  |              |
| CN | 108983491 A |   | 12/2018 |              |
| CN | 209055687 U |   | 7/2019  |              |
| CN | 209149019 U |   | 7/2019  |              |
| CN | 110471207 A |   | 11/2019 |              |
| CN | 111393578 A |   | 7/2020  |              |
| CN | 111650678 A |   | 9/2020  |              |
| CN | 112130379 A |   | 12/2020 |              |
| CN | 113493660 A |   | 10/2021 |              |
| CN | 113985659 A |   | 1/2022  |              |

* cited by examiner

QUANTUM DOT INTEGRATED BOARD, METHOD FOR PREPARING QUANTUM DOT INTEGRATED BOARD, AND DISPLAY APPARATUS INCLUDING QUANTUM DOT INTEGRATED BOARD

CROSS-REFERENCE TO RELATED APPLICATION

This application is a National Stage Filing of the PCT International Application No. PCT/CN2022/130404 filed on Nov. 7, 2022, which claims priority to Chinese Patent Application No. 202111316972.8 filed to the China National Intellectual Property Administration on Nov. 9, 2021 and entitled "Quantum Dot Integrated Board, Method for Preparing Quantum Dot Integrated Board, and Display Apparatus Including Quantum Dot Integrated Board".

TECHNICAL FIELD

The disclosure belongs to the technical field of quantum dot optical boards, and specifically, to a quantum dot integrated board, a method for preparing a quantum dot integrated board, and a display apparatus including a quantum dot integrated board.

BACKGROUND

Because of the characteristics of being wide in excitation spectrum, narrow in emission spectrum, high in color purity, and good in light stability, a quantum dot material is applied to the field of display, and may effectively improve the color gamut of a device and make the display effect of the device be more vibrant and vivid. A quantum dot integrated board may effectively apply the excellent optical performance of the quantum dot material to the current backlight display system, so as to popularize and universalize a quantum dot high color gamut display technology. However, in an application process, quantum dots are simultaneously affected by factors such as water, oxygen, and heat, resulting in poor stability of the quantum dots. Meanwhile, different requirements on a quantum dot device are proposed for backlights in different liquid crystal display devices (commonly used televisions and computer display apparatuses on the market are mainly in a direct-lit type and an edge-lit type, and devices such as a notebook computer, a Pad, and a mobile phone mainly use edge-lit type display apparatuses).

However, there are at least the following disadvantages in the related art: (1) an optical board material and an optical film need to be combined with a backlighting source, and a backlighting source required for a set of televisions can be achieved through complex combination; (2) light emitted by green quantum dots is absorbed by red quantum dots, such that the light-emitting efficiency of a quantum dot board material is affected, and the utilization rate of a quantum dot material for blue light is limited; and (3) high assembling cost and film material cost lead to high use cost of a quantum dot light conversion film.

CN111393578A discloses a wide color gamut composite film, which includes a brightness enhancement layer and a diffusion layer. The brightness enhancement layer includes two portions; one portion is a brightness enhancement base material layer, which is generally made of PET; and the other portion is quadrangular structures which are consistent in shape, are tightly arranged, and have isosceles trapezoidal cross-sections. A quadrangular prism is made of quantum dot UV resin with a high refractive index. The lower end face of the quadrangular prism with a large area is connected to the brightness enhancement base material layer, and the upper end face parallel to the brightness enhancement base material layer is connected to the bottom face of the diffusion layer. In the patent application, while the refractive index of the resin itself is improved by adding sulfur-containing acrylic ester monomer, the compatibility of the quantum dot UV resin with a high refractive index and the stability of the quantum dots are also improved by using coordination of sulfur and metal atoms on the surfaces of the quantum dots. A slant quadrangular brightness enhancement structure including the quantum dots is prepared by means of the quantum dot UV resin with a high refractive index, such that the brightness enhancement structure has the functions of enhancing brightness and improving color gamut. In addition, adhesion is better by connecting a side face of the quadrangular prism to the bottom face of a diffusion film; and at the same time, more integrated functions are achieved, the composite film is thinner and lighter, and cost is lower.

CN111650678A discloses a high brightness quantum dot film, which includes a lower base material, a first structural layer, a second structural layer, and an upper base material, which are sequentially arranged from bottom to top. An upper end surface of the first structural layer and a lower end surface of the second structural layer are triangular prisms sequentially arranged; a red quantum dot material and a green quantum dot, with a weight ratio of 1:1, are respectively added in the first structural layer and the second structural layer; and the refractive index of the first structural layer is greater than the refractive index of the second structural layer. With the design of the prism structure, in combination of the refractive index difference of the two micro-structure layers, the quantum dot film prepared in the patent application may have an optical light-gathering effect; and with combined use of a blue light LED backlight module, a liquid crystal display may have improved screen color saturation while having the effect of improving brightness, such that the purpose of wide color gamut and energy saving is achieved.

CN108303819A discloses a backlight source, a method for manufacturing a backlight source, a light guide plate, a method for manufacturing a light guide plate, and a display apparatus, which specifically disclose that the refractive index to of a transparent adhesive meets the following: t1≤t0≤t2, where t1 is the refractive index of the light guide plate, and t2 is the refractive index of an optimal film layer. By means of filling the transparent adhesive between the optimal film layer and a light guide plate body, it is ensured that the refractive index of the transparent adhesive is greater than or equal to the refractive index of the light guide plate and is less than or equal to the refractive index of the optimal film layer, light may always be transmitted from an optically thinner medium to an optically denser medium during the process of entering the optimal film layer from the light guide plate, such that partial light may be effectively prevented from being totally reflected during transmission, thereby improving the utilization rate of the light.

In the above related art, while incorporating the characteristics of high color gamut output of the quantum dot film, and partially involving the design of light propagation paths of the light through each layer structure, the utilization rate of the light and an anti-blue light effect need to be further improved.

SUMMARY

The disclosure is intended to provide a quantum dot integrated board, a method for preparing a quantum dot integrated board, and a display apparatus including a quantum dot integrated board, so as to overcome the disadvantage that the brightness and anti-blue light effect of a quantum dot optical board in the related art need to be further improved. The quantum dot integrated board is able to not only improve brightness, but also reduce blue light output, such that the quantum dot integrated board is wide in application range.

In order to implement the above objective, some embodiments of the disclosure provide a quantum dot integrated board, which includes a first optical transition layer, a first quantum dot layer, a second optical transition layer, and a second quantum dot layer, which are sequentially arranged. The refractive indexes of the layers meet: $t_{first\ optical\ transition\ layer} < t_{first\ quantum\ dot\ layer}$, $t_{second\ optical\ transition\ layer} < t_{first\ quantum\ dot\ layer}$, $t_{second\ optical\ transition\ layer} < t_{second\ quantum\ dot\ layer}$; a side of the first quantum dot layer that is close to the second optical transition layer is provided with a first micro-structure pattern; a side of the second quantum dot layer that is away from the second optical transition layer is provided with a second micro-structure pattern; and the first quantum dot layer includes a red quantum dot material, and the second quantum dot layer includes a green quantum dot material.

In an embodiment mode, an outer surface of the first micro-structure pattern and an outer surface of the second micro-structure pattern are respectively independently in a plate shape, an arc shape, or a combination of the plate shape and the arc shape.

In an embodiment mode, the first micro-structure pattern and the second micro-structure pattern respectively independently meet the following: the micro-structure pattern comprises a vertex, and an angle where the vertex is located is 45°-135°.

In an embodiment mode, the first micro-structure pattern and the second micro-structure pattern respectively have a plurality of repeating units; and each of the repeating units respectively independently meets the following: a maximum width is 10 μm-100 μm, and a maximum height is 2 μm-120 μm.

In an embodiment mode, the repeating units of the first micro-structure pattern and/or the second micro-structure pattern meet the following: the maximum width is 50 μm, and the maximum height is 25 μm.

In an embodiment mode, the first micro-structure pattern and the second micro-structure pattern are respectively independent of a prism structure.

In an embodiment mode, in the direction of vertical propagation of light, an included angle mutually formed by the first micro-structure pattern and the second micro-structure pattern is 0-180°; in an embodiment mode, the included angle is 45°-135°; and in an embodiment mode, the included angle is 90°.

In an embodiment mode, the quantum dot integrated board further includes of resin powder, which is disposed in the first optical transition layer.

In an embodiment mode, compared with the first optical transition layer, a content of the resin powder is 1 wt %-50 wt %.

In an embodiment mode, a material of the resin powder is the same as a base material of the first quantum dot layer.

In an embodiment mode, an average particle size of the resin powder is 1 μm-100 μm.

In an embodiment mode, a thicknesses of the first optical transition layer and the second optical transition layer are respectively independently 10 μm-500 μm, in an embodiment mode, 10 μm-200 μm; and a thicknesses of the first quantum dot layer and the second quantum dot layer are respectively independently 0.05 mm-1.5 mm.

Some embodiments of the disclosure provide a method for preparing the quantum dot integrated board includes the following steps.

At step (1), a first quantum dot sheet and a second quantum dot sheet are prepared.

At step (2), a first micro-structure pattern and a second micro-structure pattern are respectively produced on one side of the first quantum dot sheet and one side of the second quantum dot sheet.

At step (3), the refractive indexes of the first quantum dot sheet and the second quantum dot sheet are tested, a light-curing adhesive or a pressure sensitive adhesive is selected, and the light-curing adhesive or the pressure sensitive adhesive is respectively coated on the other side of the first quantum dot sheet and the other side of the second quantum dot sheet, so as to form a first optical transition layer and a second optical transition layer.

At step (4), the side of the first quantum dot sheet that is provided with the first micro-structure pattern, and the side of the second quantum dot sheet that is coated with the light-curing adhesive or the pressure sensitive adhesive are attached, so as to form a quantum dot integrated board with changes in light refraction.

In an embodiment mode, in step (1), preparation of the first quantum dot sheet and the second quantum dot sheet separately independently includes: mixing a quantum dot solution and a polymer material, and then performing molding processing.

In an embodiment mode, in step (2), the first micro-structure pattern and the second micro-structure pattern are formed through pressing by means of a micro-structure roller.

In an embodiment mode, the method further includes: in step (3), introducing resin powder into the light-curing adhesive or the pressure sensitive adhesive, which is coated on the first quantum dot sheet.

Some embodiments of the disclosure provide a display apparatus, which includes the quantum dot integrated board described in the first aspect.

In an embodiment mode, the display apparatus further includes a panel, and a diffusion plate or a light guide plate.

The panel is provided on an outer side of the second quantum dot layer of the quantum dot integrated board.

The diffusion plate or the light guide plate is provided on a side of the quantum dot integrated board that is away from the panel.

In an embodiment mode, when the display apparatus is in a direct-lit backlight mode, a thicknesses of the first optical transition layer and the second optical transition layer in the quantum dot integrated board are respectively independently 0.5 mm-1.5 mm; and when the display apparatus is in an edge-lit backlight mode, a thicknesses of the first quantum dot layer and the second quantum dot layer in the quantum dot integrated board are respectively independently 0.05 mm-0.5 mm.

In the disclosure, through the above structure design, the optical transition layers are provided, and the refractive index of each layer is designed according to a "small-large-small-large" rule, such that the micro-structure of the quantum dot layer is better used; and by increasing or reducing light refraction or reflection probability to improve the utilization rate of the light, and simultaneously improving the utilization rate of the red and green quantum dot materials for blue light, the output of the blue light is reduced while the brightness value of a quantum dot board material is increased. Because of the high enough brightness value, a diffusion film and a brightness enhancement film in a conventional display apparatus structure are not required when the quantum dot integrated board of the disclosure is used to form the display apparatus, such that the cost and assembling cost of an optical film may be greatly reduced.

The preparation method provided in the disclosure is wide in adaptability and simple in process; and the quantum dot integrated board with different thicknesses is prepared according to different display apparatuses, such that an application range of quantum dots is increased. The quantum dot integrated board may not only be applied to an edge-lit display apparatus, but also be applied to a direct-lit display apparatus. A device terminal may be extended to various terminals such as a television, a computer display, a notebook computer, a pad, and a mobile phone.

REFERENCE SIGNS OF THE DRAWINGS

1—First optical transition layer; 2—First quantum dot layer; 3—Second optical transition layer;
4—Second quantum dot layer; 5—Resin powder; A—Quantum dot integrated board;
6—Panel; 7—Diffusion plate; 8—Light guide plate.

DETAILED DESCRIPTION OF THE EMBODIMENTS

Endpoints of the ranges and any values disclosed herein are not limited to a precise range or value, and those ranges or values should be understood to include values close to those ranges or values. For a numerical range, the endpoint values of each range, the endpoint values of each range and individual point values, and the individual point values are combined with each other, so as to obtain one or more new numerical ranges, and these numerical ranges shall be deemed to be specifically disclosed herein.

Figure 1:
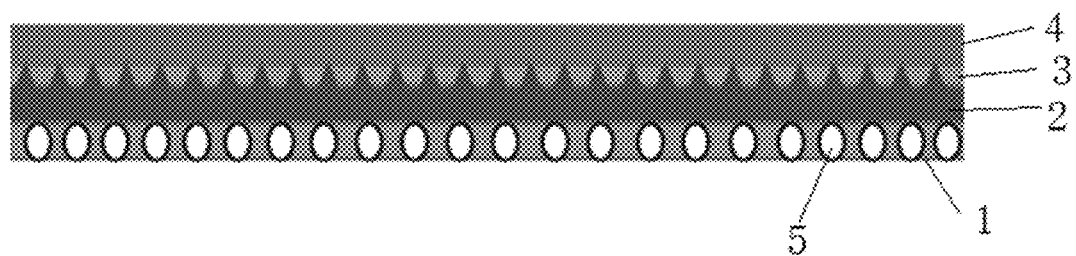
FIG. 1 is a front view of a specific implementation of a quantum dot integrated board according to the disclosure.
Figure 2:
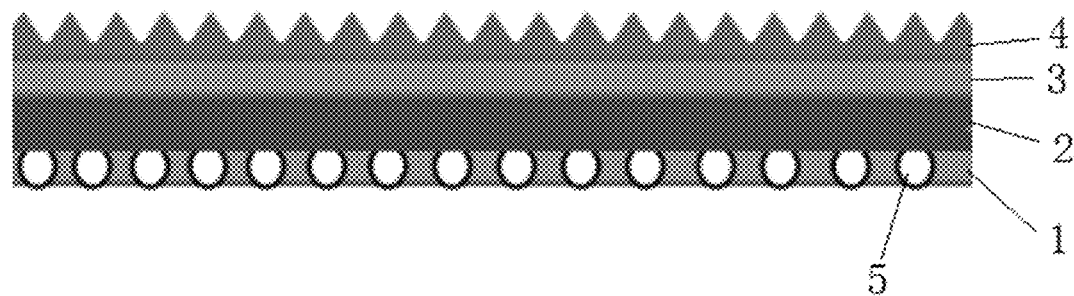
FIG. 2 is a side view of FIG. 1.

As described above, some embodiments of the disclosure provides a quantum dot integrated board. As shown in FIG. 1 and FIG. 2, the quantum dot integrated board includes a first optical transition layer 1, a first quantum dot layer 2, a second optical transition layer 3, and a second quantum dot layer 4, which are sequentially arranged. The refractive indexes of the layers meet: $t_{first\ optical\ transition\ layer} < t_{first\ quantum\ dot\ layer}$, $t_{second\ optical\ transition\ layer} < t_{first\ quantum\ dot\ layer}$, $t_{second\ optical\ transition\ layer} < t_{second\ quantum\ dot\ layer}$; a side of the first quantum dot layer 2 that is close to the second optical transition layer 3 is provided with a first micro-structure pattern; a side of the second quantum dot layer 4 that is away from the second optical transition layer 3 is provided with a second micro-structure pattern; and the first quantum dot layer 2 includes a red quantum dot material, and the second quantum dot layer 4 includes a green quantum dot material.

During study, the applicants of the disclosure found that, through the above structure design of each layer, in particular, the refractive index of each layer being designed according to a small-large-small-large rule ("small" or "large" are relative to neighboring layers), and in combination with the micro-structure pattern, which is correspondingly arranged on the quantum dot layer including the red and green quantum dot materials, the characteristics of a brightness enhancement structure and quantum dot materials are fully achieved. Specifically, a light gathering effect is fully achieved through cooperation of the first quantum dot layer 2 with the first micro-structure pattern provided on the first quantum dot layer, and the transmission of light from the first quantum dot layer 2 to the second optical transition layer 1 is from an optically denser medium into an optically thinner medium, causing partial light to be repeatedly reflected in the first quantum dot layer 2, such that the utilization rate of the light is increased; and meanwhile, the entering of the light from the first optical transition layer 1 into the first quantum dot layer 2 and from the second optical transition layer 3 into the second quantum dot layer 4 is from the optically thinner medium into the optically denser medium, such that a light reflection phenomenon is reduced, the amount of the light entering the quantum dot layer is increased, light losses are reduced, and the brightness of the quantum dot integrated board is significantly improved according to the refractive index change rule.

In another aspect, generally, for a quantum dot diffusion plate with red and green quantum dots mixed together, blue light simultaneously excites red quantum dots and green quantum dots, so as to emit red light and green light. However, the green light portion of the quantum dots is absorbed by the red quantum dots to excite the red quantum dot material, causing the performance of the green quantum dots to be unable to be maximized, such that more green quantum dots and blue light need to be used to achieve the same effect. In addition, the blue light in the related art generally directly passes the quantum dot diffusion plate, and there is no process of repeatedly use of the blue light in a first quantum dot sheet and a second quantum dot sheet, such that the utilization rate of the blue light is low, so as to cause more blue light to transmit through the quantum dot diffusion plate. In the quantum dot integrated board of the disclosure, the blue light first passes through the first quantum dot sheet including the red quantum dots, and since a transmission path of the blue light is from the optically denser medium to the optically thinner medium, partial blue light is repeatedly reflected in the first quantum dot sheet, such that the blue light may fully excite the red quantum dots. When the blue light and red light enter the second quantum dot sheet including the green quantum dots, partial blue light and red light are repeatedly reflected in the second quantum dot sheet, and the red light does not excite the green quantum dots, such that the blue light may fully excite the green quantum dots, so as to cause the performance of the green quantum dots to be maximized, thereby improving the utilization rate of the blue light, and significantly reducing the output of the blue light.

In the disclosure, the red quantum dot material and the green quantum dot material both are current available commercially, and can also be obtained through preparation by means of existing methods, such that details are not described herein again.

In the disclosure, "the optical transition layer" is understood as a gradient transition layer with changes in refractive index of light; and the effect of the optical transition layer lies in that, first, light transmittance is improved, and a light reflection phenomenon caused by the difference in the refractive index at an attached part of the side faces of the quantum dot layers is reduced; and second, changes in angles of the light in the optical transition layer is increased at the same time, so as to achieve a certain effect of diffusing and hazing the light.

Materials of the first optical transition layer 1 and the second optical transition layer 3 are not specifically limited in the disclosure, as long as the specific refractive index is met and the materials are suitable for an optical board. The non-limiting listed base material of the optical transition layer is selected from PMMA, PET, PC, MS, PP, PS, and PE.

In the disclosure, the specific selection of the refractive index of each layer, as long as the above refractive index rule is met, facilitates improvement of brightness and reduction in the output of the blue light. For example, in an embodiment mode, the refractive indexes of the first quantum dot layer 2 and the second quantum dot layer 4 are respectively independently 1.3-1.7; and the refractive indexes of the first optical transition layer 1 and the second optical transition layer 3 are respectively independently 1-1.6, and simultaneously meet the above refractive index rule.

It is understandable that, refractive indexes of the first quantum dot layer 2 and the second quantum dot layer 4 are the same or different. The refractive indexes of the first optical transition layer 1 and the second optical transition layer 3 are the same or different.

Figure 3:
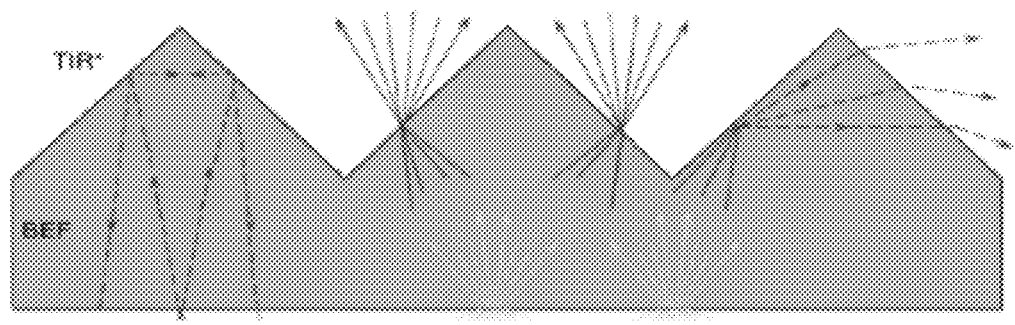
FIG. 3 is a schematic diagram of light refraction of a micro-structure pattern provided in a quantum dot integrated board according to the disclosure.

In the disclosure, "the micro-structure pattern" refers to a structure pattern with a micrometer size, and has a light gathering effect on light. Specifically, for example, the following four situations of light propagation from left to right shown in FIG. 3 are included: a, the light is caused to be as fully reflective as possible (TIR+, for example, total internal reflection in a micro-structure unit on the same micro-structure pattern); b, refractable light is increased; c, the ratio of light losses is reduced; and d, refracted light is reused (for example, the light is refracted from one micro-structure unit into the next micro-structure unit for reuse). In this way, partial light is able to be repeatedly reflected in the corresponding quantum dot layer, so as to increase the utilization rate of the light, thereby reducing the output of the blue light while guaranteeing brightness enhancement.

In the disclosure, a specific shape of the micro-structure pattern is selected in a wider range, for example, is in a plate shape (such as a prism), is in an arc shape (such as a sphere or an ellipsoid), and may also be a combination of the plate shape and the arc shape, as long as the improvement of the brightness and reduction in the output of the blue light is facilitated.

In an embodiment mode, the first micro-structure pattern and the second micro-structure pattern respectively independently meet the following: the micro-structure pattern comprises a vertex, and an angle where the vertex is 45°-135°. Under the preferred solution, multi-level reuse of the light reflected by an adjacent interface is achieved, so as to improve the brightness and reduce the output of the blue light.

In the disclosure, the angle where the vertex is located refers to the maximum angle where the vertex is located. It is to be understood that, the vertex is formed by at least two planes, at least one cambered surface, or a combination of a plurality of planes and a plurality of cambered surfaces. The angle where the vertex is located refers to the maximum angle between any two faces, which form the same vertex. Exemplarily, when the vertex is formed by the cambered surface, the angle where the vertex is a taper angle.

In an embodiment mode, the angle where the vertex of the second micro-structure pattern is located is 70°-110°. In an embodiment mode, the angle where the vertex of the second micro-structure pattern is located is 80°-100°. In an embodiment mode, the angle where the vertex of the second micro-structure pattern is located is 90°. Under the preferred solution, it is more conductive to multiple reflection or refraction of light for brightness enhancement, and it is more conductive to maximizing of reflection or refraction of light to return to the second quantum dot layer and act on the quantum dot material.

In a preferred implementation of the disclosure, the first micro-structure pattern and the second micro-structure pattern respectively have a plurality of repeating units; and each of the repeating units respectively independently meets the following: a maximum width is 10 μm-100 μm, and a maximum height is 2 μm-120 μm.

Therefore, a person skilled in the art may think in terms of improving brightness and anti-blue light, so as to select the respective sizes of the corresponding repeating units of the first micro-structure pattern and the second micro-structure pattern.

In an embodiment mode, the repeating units of the first micro-structure pattern and/or the second micro-structure pattern meet the following: the maximum width is 10 μm-100 μm. In an embodiment mode, the maximum width is 50 μm; and the maximum height is 10-70 μm. In an embodiment mode, the maximum width is 25 μm. Under the preferred solution, it is more preferable to multiple reflection or refraction of light for brightness enhancement, and it is more preferable of maximization of reflection or refraction of light to return to the second quantum dot layer and act on the quantum dot material.

According to the disclosure, in an embodiment mode, the first micro-structure pattern and the second micro-structure pattern are respectively independent of a prism structure, with a cross section being shown in FIG. 3, and refraction and reflection conditions are in the arrow direction shown in FIG. 3.

The first micro-structure pattern and the second micro-structure pattern are the same or different.

In an embodiment mode, in the direction of vertical propagation of light, an included angle (which is also called an included angle of two micro-structures) mutually formed by the first micro-structure pattern and the second micro-structure pattern is 0-180°. In an embodiment mode, the included angle is 45°-135°. In an embodiment mode, the included angle is 90°. By using the preferred solution of the disclosure, the utilization rate of the light is better improved, and the blue light is reduced.

In the disclosure, the "included angle mutually formed by the first micro-structure pattern and the second micro-structure pattern in the direction of vertical propagation of light" refers to an included angle, in the same vertical direction of light propagation, between the corresponding surface of the first micro-structure pattern in the vertical direction and the corresponding surface (or a face where an extension line of the second micro-structure pattern is located) of the second micro-structure pattern in the vertical direction. It is understandable that, the "face" here refers to a plane or a cambered surface.

According to the disclosure, in an embodiment mode, as shown in FIG. 1 and FIG. 2, the quantum dot integrated board further includes resin powder 5, which is disposed in the first optical transition layer 1. Under the preferred solution, on the one hand, the resin powder 5 is able to form certain roughness on a light entry face of the first optical transition layer 1, so as to cause the light entry face of the first optical transition layer 1 to be a rough surface, such that a specular reflection phenomenon is reduced, and light entry amount is increased, thereby facilitating the improvement of the brightness of the quantum dot integrated board and the improvement of utilization rate of the red and green quantum dot materials for the blue light; on the other hand, when more blue light enters the first quantum dot layer 2 by passing through the first optical transition layer 1, since there is a difference between the refractive index of the resin powder 5 and the refractive index of an adhesive, the angle of light propagation is changed, such that the light is diverged from a plurality of angles, thereby achieving the effect of homogenizing and diverging the light.

It is to be understood that, the resin powder 5 is dispersed in the first optical transition layer 1 in a uniform manner, which is more conducive to homogenizing the light and promoting multi-directional use.

In an embodiment mode, compared with the first optical transition layer, a content of the resin powder 5 is 1 wt %-50 wt %.

In an embodiment mode, a material of the resin powder 5 is the same as a base material of the first quantum dot layer 2. In the preferred solution, a brightness enhancement structure is fully achieved, such that changes in refractive index are more excellent.

A person skilled in the art may select the particle size of the resin powder according to brightness and propagation of the blue light. In an embodiment mode, an average particle size of the resin powder 5 is 1 µm-100 µm.

In the disclosure, the "average particle size" refers to an average diameter.

According to the disclosure, in an embodiment mode, the thicknesses of the first optical transition layer 1 and the second optical transition layer 3 are respectively independently 10 µm-500 µm. In an embodiment mode, the thicknesses of the first optical transition layer 1 and the second optical transition layer 3 are respectively independently 10 µm-200 µm. In an embodiment mode, the thicknesses of the first optical transition layer 1 and the second optical transition layer 3 are respectively independently 10 µm-100 µm.

In an embodiment mode, the thicknesses of the first quantum dot layer 2 and the second quantum dot layer 4 are respectively independently 0.05 mm-1.5 mm.

A person skilled in the art may select the base materials of the first quantum dot layer 2 and the second quantum dot layer 4 according to actual situations. In an embodiment mode, the first quantum dot layer 2 further includes a first polymer material; and the second quantum dot layer 4 further includes a second polymer material.

Materials of the first polymer material and the second polymer material is the same or different, preferably, the same. In the disclosure, there is no limitation to the specific type of the polymer material, and the polymer material is any polymer material suitable for the optical board existing in the art. Exemplarily, the polymer material is a resin material, such as PE, PS, PMMA, PC, MS, PET, and PP.

In the corresponding quantum dot layer of the disclosure, a person skilled in the art may select the ratio of the quantum dot material included in the quantum dot layer to the corresponding polymer material according to actual requirements. Exemplarily, in the first quantum dot layer 2, a weight ratio of the red quantum dot material to the first polymer material is 1:100-10000. Exemplarily, in the second quantum dot layer 4, a weight ratio of a green quantum dot material to the second polymer material is 1:100-10000.

A second aspect of the disclosure provides a method for preparing the quantum dot integrated board includes the following steps.

At step (1), a first quantum dot sheet and a second quantum dot sheet are prepared.

At step (2), a first micro-structure pattern and a second micro-structure pattern are respectively produced on one side of the first quantum dot sheet and one side of the second quantum dot sheet.

At step (3), the refractive indexes of the first quantum dot sheet and the second quantum dot sheet are tested, a light-curing adhesive or a pressure sensitive adhesive is selected, and the light-curing adhesive or the pressure sensitive adhesive is respectively coated on the other side of the first quantum dot sheet and the other side of the second quantum dot sheet, so as to form a first optical transition layer 1 and a second optical transition layer 3.

At step (4), the side of the first quantum dot sheet that is provided with the first micro-structure pattern, and the side of the second quantum dot sheet that is coated with the light-curing adhesive or the pressure sensitive adhesive are attached, so as to form a quantum dot integrated board with changes in light refraction.

According to the preparation method provided in the disclosure, cooperation with specific refractive index design and micro-structure pattern design is achieved by using the light-curing adhesive or the pressure sensitive adhesive to form the first optical transition layer 1 and the second optical transition layer 3, such that the prepared quantum dot integrated board can better improve color gamut and reduce blue light output in combination with the light effect characteristics of the quantum dot material while the brightness enhancement effect on the light and the effect of the quantum dots on blue light utilization are both maximized.

In step (1), a person skilled in the art may select the existing method to prepare the quantum dots according to requirements.

In a preferred implementation, preparation of the first quantum dot sheet and the second quantum dot sheet separately independently includes: mixing a quantum dot solution and a polymer material, and then performing molding processing.

It is understandable that, in step (1), the corresponding quantum dot solution in preparation of the first quantum dot sheet is a solution containing the red quantum dot material; and the corresponding quantum dot solution in preparation of the second quantum dot sheet is a solution containing the green quantum dot material. Preparation of the solution is well known by a person skilled in the art, such that details are not described herein again.

The polymer materials respectively corresponding to the first quantum dot sheet and the second quantum dot sheet during preparation are respectively a first polymer material and a second polymer material.

According to the disclosure, specific process of the molding processing includes a molding mode and process parameters. A person skilled in the art may perform selection according to actual requirements. In an embodiment mode, the molding processing is extrusion molding. A device for the extrusion molding is enumerated as a screw extruder.

In an embodiment mode, the extrusion molding is performed at 120° C.-300° C.

In step (1) of the disclosure, the materials obtained through mixing are stretched into the quantum dot sheets by means of the molding processing as the first quantum dot layer 2 and the second quantum dot layer 4.

In step (2) of the disclosure, for formation modes of the first micro-structure pattern and the second micro-structure pattern, a person skilled in the art may prepare the first micro-structure pattern and the second micro-structure pattern by using any existing methods, for example, the first micro-structure pattern and the second micro-structure pattern are directly obtained through inkjet printing, and may also be manufactured by using methods such as roll forming and additive manufacturing.

In an embodiment mode, the first micro-structure pattern and the second micro-structure pattern are formed through pressing by means of a micro-structure roller. Under the preferred solution, simple and efficient process are realized.

The micro-structure roller performs pressing under conditions that a micro-structure is able to be formed. For example, pressing formation of the micro-structure roller is performed under a high temperature condition.

In step (3) of the disclosure, according to the requirement that the refractive index needs to be met, the refractive indexes of the first quantum dot sheet and the second quantum dot sheet are tested, the light-curing adhesive or the pressure sensitive adhesive is selected and coated on the other side of the first quantum dot sheet and the other side of the second quantum dot sheet. It is understandable that, the micro-structure pattern and the coating adhesive are respectively located on two sides of the quantum dot sheet.

It is to be understood that, the coating adhesive on the quantum dot sheet is subjected to light curing (uv light curing is preferred) or pressing in the appropriate process according to subsequent layer attachment requirements, so as that a solid optical transition layer, as long as the first optical transition layer 1 and the second optical transition layer 3 are able to be finally formed. For example, if one of the coating adhesives does not need to attach to other layers subsequently, light curing or pressing is performed in step (3); and if other layers need to be attached to later, light curing or pressing is performed after attachment is performed in subsequent steps.

In an embodiment mode, the method further includes: in step (3), introducing resin powder 5 into the light-curing adhesive or the pressure sensitive adhesive, which is coated on the first quantum dot sheet.

It is to be understood that, the resin powder 5 is mixed in the light-curing adhesive or the pressure sensitive adhesive.

In step (4) of the disclosure, the fact that "the side of the first quantum dot sheet that is provided with the first micro-structure pattern, and the side of the second quantum dot sheet that is coated with the light-curing adhesive or the pressure sensitive adhesive are attached" means that the surface of the first micro-structure pattern on the first quantum dot sheet is attached to the surface of the coating adhesive of the second quantum dot sheet. After attachment, the second optical transition layer 3 is then formed between the first quantum dot sheet and the second quantum dot sheet after light curing or pressing.

In the disclosure, it is to be understood that, the amount of raw materials used meets the structure and composition of each layer. The structure and composition of each layer are respectively the same as the first aspect, and details are not described herein again.

A third aspect of the disclosure provides a display apparatus, which includes the quantum dot integrated board described in the first aspect.

The quantum dot integrated board provided in the disclosure is applied to existing modules of any form, and includes, but is not limited to, a conventional direct-lit module (of which structure is generally a panel 6, a brightness enhancement film, a diffusion film, and a diffusion plate 7), and a conventional edge-lit display apparatus (of which structure is generally a panel 6, a brightness enhancement film, a diffusion film, and a light guide plate 8). The quantum dot integrated board provided in the disclosure is able to achieve brightness enhancement and protect against blue light, is used in a module, and is able to reduce the cost and assembling cost of an optical film without adding a plurality of assemblies for achieving brightness enhancement and protecting against blue light.

Figure 4:
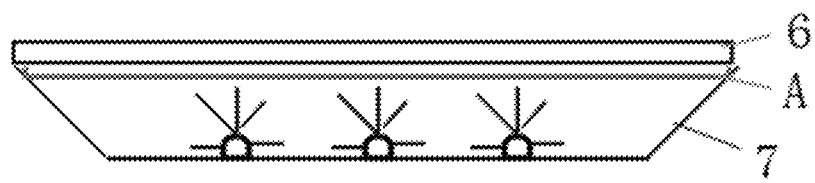
FIG. 4 shows a direct-lit display apparatus according to the disclosure.

In a preferred implementation, the display apparatus is in a direct-lit backlight mode, as shown in FIG. 4, the display apparatus includes a panel and a diffusion plate.

The panel 6 is provided on an outer side of a second quantum dot layer 4 of the quantum dot integrated board A.

The diffusion plate 7 is provided on the side of the quantum dot integrated board A that is away from the panel 6.

In an embodiment mode, the thicknesses of the first quantum dot layer and the second quantum dot layer in the quantum dot integrated board A are respectively independently 0.5 mm-1.5 mm.

Figure 5:
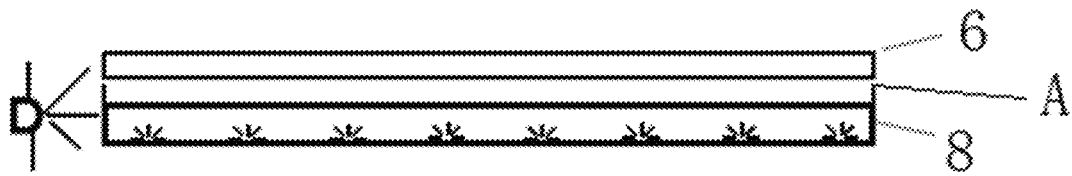
FIG. 5 shows a edge-lit display apparatus according to the disclosure.

In another preferred implementation, the display apparatus is in an edge-lit backlight mode, as shown in FIG. 5, the display apparatus includes a panel and a light guide plate.

The panel 6 is provided on an outer side of a second quantum dot layer 4 of the quantum dot integrated board A.

The light guide plate 8 is provided on the side of the quantum dot integrated board A that is away from the panel 6.

In an embodiment mode, the thicknesses of the first quantum dot layer and the second quantum dot layer in the quantum dot integrated board A are respectively independently 0.05 mm-0.5 mm.

In the disclosure, there is no limitation to the specific type of the panel 6, for example, the panel is a liquid crystal panel.

The disclosure is described in detail below with reference to embodiments.

Embodiment 1

A quantum dot integrated board includes a first optical transition layer 1, a PS first quantum dot layer 2, a second optical transition layer 3, and a PS second quantum dot layer 4, which are sequentially arranged. The first optical transition layer 1 is under the first quantum dot layer 2; and the second optical transition layer 3 is between the first quantum dot layer 2 and the second quantum dot layer 4. The first optical transition layer 1 and the second optical transition layer 3 both are formed by an acrylic resin-based adhesive by means of curing.

A specific preparation method for the quantum dot integrated board includes the following steps.

(1) Red and green quantum dot solutions are respectively mixed with a polymer material PS, then extrusion processing is performed at 200° C. by means of a screw extruder, and a micro-structure pattern is pressed on one side of a sheet by using a micro-structure roller while a quantum dot sheet is formed through stretching, so as to prepare a first quantum dot sheet including a red quantum dot material and a second quantum dot sheet including a green quantum dot material, that is, the first quantum dot layer 2 provided with a first micro-structure pattern, and the second quantum dot layer 4 provided with a second micro-structure pattern are obtained.

(2) A uv light-curing adhesive is coated on the back side of the micro-structure of the first quantum dot sheet, and then the first optical transition layer 1 is formed on the first quantum dot sheet after uv light-curing.

(3) The uv light-curing adhesive is coated on the back side of the micro-structure of the second quantum dot sheet, then the micro-structure face of the first quantum dot sheet is attached to the back side of the micro-structure of the second quantum dot sheet by means of the coated uv light-curing adhesive, and the second optical transition layer 3 is formed between the first quantum dot sheet and the second quantum dot sheet after uv curing, so as to finally prepare the quantum dot integrated board.

The refractive index of the first optical transition layer 1 is 1.49, and the thickness is 200 μm; the refractive index of the first quantum dot layer 2 is 1.52, and the thickness is 0.5 mm; the refractive index of the second optical transition layer 3 is 1.49, and the thickness is 200 μm; and the refractive index of the second quantum dot layer 4 is 1.52, and the thickness is 0.5 mm. The first micro-structure pattern and the second micro-structure pattern both are of a prism structure; and repeating units of the micro-structure pattern of the first quantum dot layer 2 and the micro-structure pattern of the second quantum dot layer 4 all meet the following: a vertex is 45° C., the maximum height is 120 μm, and in the direction of vertical propagation of light, the included angle mutually formed by the first micro-structure pattern and the second micro-structure pattern is 0°.

The quantum dot integrated board prepared in this embodiment is placed in the direct-lit display apparatus with the same blue light power, and a blue light irradiance meter and a color analyzer are respectively placed in the center of the board, so as to measure blue light intensity and a brightness value. The blue light intensity and brightness value of an original model optical board are tested for comparison.

The original model optical board includes a PET light diffusion layer, a PS red-green quantum dot layer, and a PET brightness enhancement layer, which are sequentially arranged and directly stacked. The refractive index of the light diffusion layer is 1.59, the refractive index of the quantum dot layer is 1.52, and the refractive index of the brightness enhancement layer is 1.59.

Tested brightness and blue light intensity data is compared with that of an original model, it is confirmed that the brightness is increased by 2.56%, and the blue light intensity is reduced by 2.11%.

Embodiment 2

Compared with the quantum dot integrated board in Embodiment 1, the difference lies in that, the maximum height of a second micro-structure pattern is 25 μm.

Tested brightness and blue light intensity data is compared with that of an original model, it is confirmed that brightness is increased by 6.05%, and blue light intensity is reduced by 5.15%.

Embodiment 3

Compared with the quantum dot integrated board in Embodiment 1, the difference lies in that, the maximum height of a second micro-structure pattern is 2 μm.

Tested brightness and blue light intensity data is compared with that of an original model, it is confirmed that brightness is increased by 2.48%, and blue light intensity is reduced by 2.75%.

Embodiment 4

Compared with the quantum dot integrated board in Embodiment 1, the difference lies in that, the maximum height of a first micro-structure pattern is 25 μm.

Tested brightness and blue light intensity data is compared with that of an original model, it is confirmed that brightness is increased by 5.55%, and blue light intensity is reduced by 4.42%.

Embodiment 5

Compared with the quantum dot integrated board in Embodiment 4, the difference lies in that, the maximum height of a second micro-structure pattern is 25 μm.

Tested brightness and blue light intensity data is compared with that of an original model, it is confirmed that brightness is increased by 9.41%, and blue light intensity is reduced by 8.34%.

Embodiment 6

Compared with the quantum dot integrated board in Embodiment 4, the difference lies in that, the maximum height of a second micro-structure pattern is 2 μm.

Tested brightness and blue light intensity data is compared with that of an original model, it is confirmed that brightness is increased by 4.29%, and blue light intensity is reduced by 4.01%.

Embodiment 7

Compared with the quantum dot integrated board in Embodiment 1, the difference lies in that, the maximum height of a first micro-structure pattern is 2 μm.

Tested brightness and blue light intensity data is compared with that of an original model, it is confirmed that brightness is increased by 2.01%, and blue light intensity is reduced by 2.98%.

Embodiment 8

Compared with the quantum dot integrated board in Embodiment 7, the difference lies in that, the maximum height of a second micro-structure pattern is 25 μm.

Tested brightness and blue light intensity data is compared with that of an original model, it is confirmed that brightness is increased by 6.49%, and blue light intensity is reduced by 5.25%.

Embodiment 9

Compared with the quantum dot integrated board in Embodiment 7, the difference lies in that, the maximum height of a second micro-structure pattern is 2 μm.

Tested brightness and blue light intensity data is compared with that of an original model, it is confirmed that brightness is increased by 2.62%, and blue light intensity is reduced by 2.01%.

Embodiment 10

Compared with the quantum dot integrated board in Embodiment 5, the difference lies in that, in the direction of vertical propagation of light, an included angle mutually formed by a first micro-structure pattern and a second micro-structure pattern is 90°.

Tested brightness and blue light intensity data is compared with that of an original model, it is confirmed that brightness is increased by 13.49%, and blue light intensity is reduced by 11.25%.

Embodiment 11

Compared with the quantum dot integrated board in Embodiment 10, the difference lies in that, in the direction of vertical propagation of light, an included angle mutually formed by a first micro-structure pattern and a second micro-structure pattern is 180°.

Tested brightness and blue light intensity data is compared with that of an original model, it is confirmed that brightness is increased by 9.62%, and blue light intensity is reduced by 9.01%.

Embodiment 12

Compared with the quantum dot integrated board in Embodiment 10, the difference lies in that, PS resin powder 5 is mixed in a first optical transition layer 1, and the average particle size of the resin powder is 1 μm; and compared with the first optical transition layer, the addition of the resin powder is 5 wt %.

Tested brightness and blue light intensity data is compared with that of an original model, it is confirmed that brightness is increased by 15.19%, and blue light intensity is reduced by 13.89%.

Embodiment 13

Compared with the quantum dot integrated board in Embodiment 12, the difference lies in that, compared with a first optical transition layer, the addition of resin powder is 50 wt %.

Tested brightness and blue light intensity data is compared with that of an original model, it is confirmed that brightness is increased by 17.40%, and blue light intensity is reduced by 14.45%.

Embodiment 14

Compared with the quantum dot integrated board in Embodiment 12, the difference lies in that, the average particle size of resin powder is 100 μm.

Tested brightness and blue light intensity data is compared with that of an original model, it is confirmed that brightness is increased by 15.77%, and blue light intensity is reduced by 13.66%.

Embodiment 15

Compared with the quantum dot integrated board in Embodiment 5, the difference lies in that, PS resin powder 5 is mixed in a first optical transition layer 1, and the average particle size of the resin powder is 100 μm; and compared with the first optical transition layer, the addition of the resin powder is 50 wt %.

Tested brightness and blue light intensity data is compared with that of an original model, it is confirmed that brightness is increased by 17.01%, and blue light intensity is reduced by 14.88%.

Comparative Example 1

Compared with the quantum dot integrated board in Embodiment 1, the difference lies in that, the refractive indexes of layers are different, and the refractive indexes (both are 1.57) of a first optical transition layer 1 and a second optical transition layer 3 are greater than the refractive indexes (both are 1.52) of a first quantum dot layer 2 and a second quantum dot layer 4.

Tested brightness and blue light intensity data is compared with that of an original model, it is confirmed that brightness is weakened by 3.69%, and blue light intensity is reduced by 1.17%.

Comparative Example 2

Compared with the quantum dot integrated board in Embodiment 1, a first micro-structure pattern and a second micro-structure pattern are not provided.

Tested brightness and blue light intensity data is compared with that of an original model, it is confirmed that brightness is weakened by 1.88%, and blue light intensity is reduced by 1.98%.

From the above embodiments and the comparative examples, it may be learned that, by using the quantum dot integrated board with a specific structure of the disclosure, especially the design of specific refractive index changes and micro-structures, the quantum dot integrated board has significant effects on improving the brightness and reducing blue light output.

Further, by comparing Embodiment 2 with Embodiment 1 and Embodiment 3, Embodiment 5 with Embodiment 4 and Embodiment 6, and Embodiment 8 with Embodiment 7 and Embodiment 9, it may be learned that, if the maximum height of the first micro-structure pattern or the second micro-structure pattern is too large or too small, the increase in the brightness is relatively low, and reduction in the blue light intensity is relatively low. The reason is that too large or too small maximum height of the first micro-structure pattern or the second micro-structure pattern is not conducive to maximizing of reflection or refraction of light to return to the second quantum dot layer, not conducive to brightness enhancement, not conducive to maximizing of reflection or refraction of blue light to return to the second quantum dot layer and interact with blue light quantum dot, and not conducive to maximizing of the utilization of the blue light.

Further, through comparison of Embodiment 10 and Embodiment 11, it may be learned that, by using the solution of preferred specific micro-structure distribution of the disclosure, the brightness is further improved, and blue light output is reduced. The reason is that, multi-level use of the light is promoted after the two micro-structure patterns form an appropriate angle, and the full utilization of the characteristics of the quantum dot material and the interaction of the blue light are promoted.

Further, through comparison of Embodiment 10 and Embodiment 12, it may be learned that, by using a preferred solution in which the resin powder 5 is added in the disclosure, the brightness is further improved, and blue light output is reduced. The reason is that, on the one hand, the resin powder 5 can reduce a specular reflection phenomenon of the first optical transition layer 1, and can increase the light entry amount of the blue light at the same time; and on the other hand, the resin powder 5 further changes the refractive index of the first optical transition layer 1, such that multi-angle and multi-directional diffusion of the light is promoted when the resin powder enters the first quantum dot layer 2.

Further, through comparison of Embodiment 12, Embodiment 13 and Embodiment 14, and Embodiment 5 and Embodiment 15, the addition of the resin powder 5 is increased, such that the brightness is improved, and blue light output is reduced; and the average particle size is increased, the brightness is improved.

What is claimed is:

1. A quantum dot integrated board, comprising a first optical transition layer, a first quantum dot layer, a second optical transition layer, and a second quantum dot layer, which are sequentially arranged, wherein the refractive indexes of the layers meet: $t_{first\ optical\ transition\ layer} < t_{first\ quantum\ dot\ layer}$, $t_{second\ optical\ transition\ layer} < t_{first\ quantum\ dot\ layer}$, $t_{second\ optical\ transition\ layer} < t_{second\ quantum\ dot\ layer}$; a side of the first quantum dot layer that is close to the second optical transition layer is provided with a first micro-structure pattern; a side of the second quantum dot layer that is away from the second optical transition layer is provided with a second micro-structure pattern; and the first quantum dot layer comprises a red quantum dot material, and the second quantum dot layer comprises a green quantum dot material.

2. The quantum dot integrated board according to claim 1, wherein an outer surface of the first micro-structure pattern and an outer surface of the second micro-structure pattern are respectively independently in a plate shape, an arc shape, or a combination of the plate shape and the arc shape.

3. The quantum dot integrated board according to claim 1, wherein the first micro-structure pattern and the second micro-structure pattern respectively independently meet the following: the micro-structure pattern comprises a vertex, and an angle where the vertex is located is 45°-135°.

4. The quantum dot integrated board according to claim 1, wherein the first micro-structure pattern and the second micro-structure pattern respectively have a plurality of repeating units; and each of the repeating units respectively independently meets the following: a maximum width is 10 μm-100 μm, and a maximum height is 2 μm-120 μm.

5. The quantum dot integrated board according to claim 4, wherein the repeating units of the first micro-structure pattern and/or the second micro-structure pattern respectively independently meet the following: the maximum width is 50 μm, and the maximum height is 25 μm.

6. The quantum dot integrated board according to claim 1, wherein the first micro-structure pattern and the second micro-structure pattern are respectively independent of a prism structure.

7. The quantum dot integrated board according to claim 1, wherein, in the direction of vertical propagation of light, an included angle mutually formed by the first micro-structure pattern and the second micro-structure pattern is 0-180°.

8. The quantum dot integrated board according to claim 7, wherein the included angle is 45°-135°.

9. The quantum dot integrated board according to claim 8, wherein the included angle is 90°.

10. The quantum dot integrated board according to claim 1, wherein the quantum dot integrated board further comprises of resin powder, wherein the resin powder is disposed in the first optical transition layer.

11. The quantum dot integrated board according to claim 10, wherein, compared with the first optical transition layer, a content of the resin powder is 1 wt %-50 wt %.

12. The quantum dot integrated board according to claim 10, wherein a material of the resin powder is the same as a base material of the first quantum dot layer.

13. The quantum dot integrated board according to claim 10, wherein an average particle size of the resin powder is 1 μm-100 μm.

14. The quantum dot integrated board according to claim 1, wherein a thicknesses of the first optical transition layer and the second optical transition layer are respectively independently 10 μm-500 μm; and a thicknesses of the first quantum dot layer and the second quantum dot layer are respectively independently 0.05 mm-1.5 mm.

15. The quantum dot integrated board according to claim 14, wherein the thicknesses of the first optical transition layer and the second optical transition layer are respectively independently 10 μm-200 μm.

16. A method for preparing the quantum dot integrated board according to claim 1, comprising the following steps:
(1) preparing a first quantum dot sheet and a second quantum dot sheet;
(2) respectively producing a first micro-structure pattern and a second micro-structure pattern on one side of the first quantum dot sheet and one side of the second quantum dot sheet;
(3) testing the refractive indexes of the first quantum dot sheet and the second quantum dot sheet, selecting a light-curing adhesive or a pressure sensitive adhesive, and respectively coating the light-curing adhesive or the pressure sensitive adhesive on the other side of the first quantum dot sheet and the other side of the second quantum dot sheet, so as to form a first optical transition layer and a second optical transition layer; and
(4) attaching the side of the first quantum dot sheet that is provided with the first micro-structure pattern to the side of the second quantum dot sheet that is coated with the light-curing adhesive or the pressure sensitive adhesive, so as to form a quantum dot integrated board with changes in light refraction.

17. The method for preparing the quantum dot integrated board according to claim 16, wherein
in step (1), preparation of the first quantum dot sheet and the second quantum dot sheet separately independently comprises: mixing a quantum dot solution and a polymer material, and then performing molding processing; and/or
in step (2), the first micro-structure pattern and the second micro-structure pattern are formed through pressing by means of a micro-structure roller.

18. The method for preparing the quantum dot integrated board according to claim 16, wherein the method for preparing the quantum dot integrated board further comprising: in step (3), introducing resin powder into the light-curing adhesive or the pressure sensitive adhesive, which is coated on the first quantum dot sheet.

19. A display apparatus, comprising the quantum dot integrated board according to claim 1.

20. The display apparatus according to claim 19, wherein the display apparatus further comprising:
a panel, provided on an outer side of the second quantum dot layer of the quantum dot integrated board; and
a diffusion plate or a light guide plate, provided on a side of the quantum dot integrated board that is away from the panel, when the display apparatus is in a direct-lit backlight mode, a thicknesses of the first optical transition layer and the second optical transition layer in the quantum dot integrated board are respectively independently 0.5 mm-1.5 mm; and when the display apparatus is in an edge-lit backlight mode, the thicknesses of the first quantum dot layer and the second quantum dot layer in the quantum dot integrated board are respectively independently 0.05 mm-0.5 mm.

* * * * *